Nov. 24, 1959 — C. R. HOLLIS ET AL — 2,913,797
FASTENING DEVICE
Filed Nov. 18, 1957
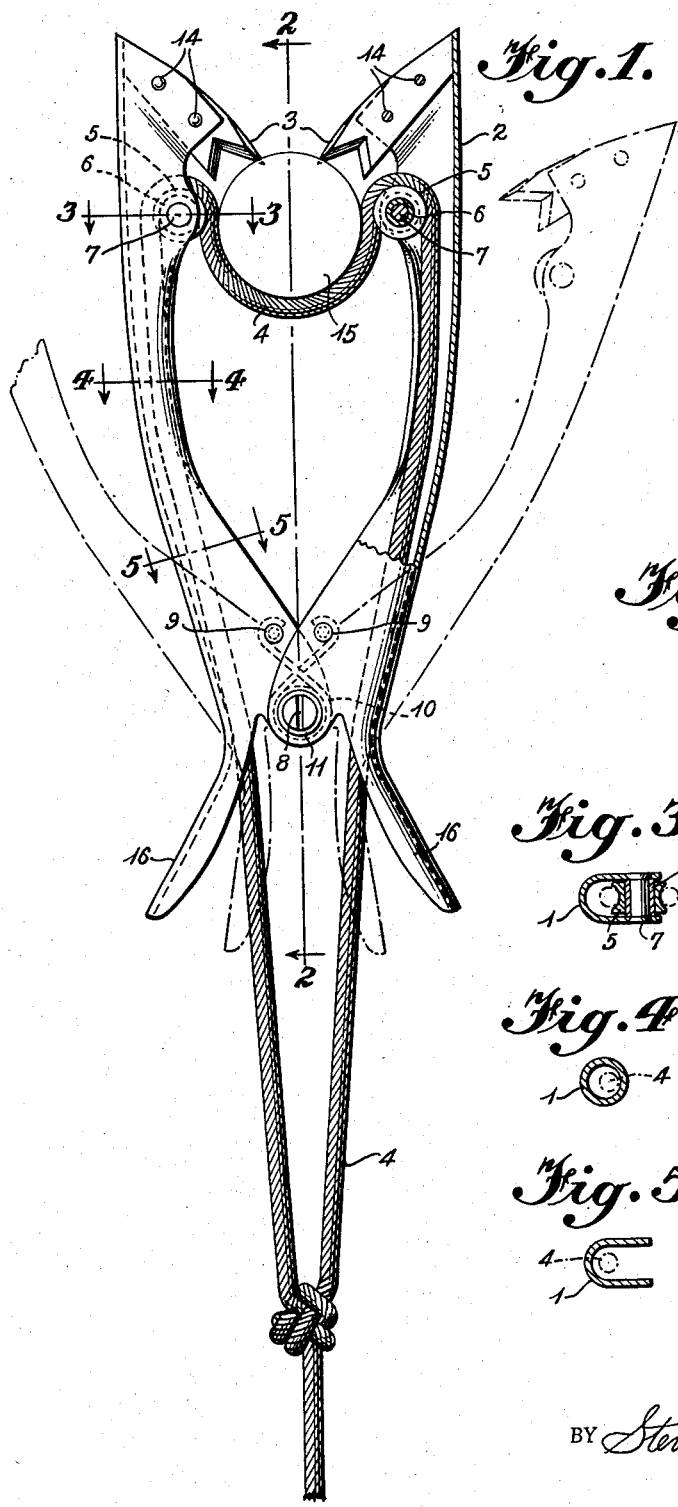
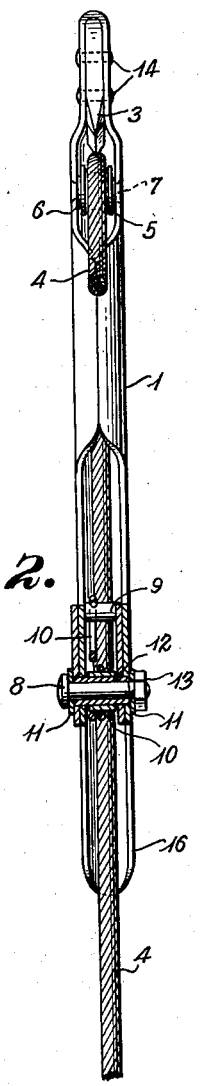
INVENTORS
Clinton R. Hollis and
Murry V. Smith
BY Stevens, Davis, Miller & Mosher
ATTORNEYS

United States Patent Office 2,913,797
Patented Nov. 24, 1959

2,913,797

FASTENING DEVICE

Clinton R. Hollis and Murry V. Smith, Camden, Ark.

Application November 18, 1957, Serial No. 697,088

10 Claims. (Cl. 24—253)

This invention relates generally to a fastening device. More particularly, it relates to a fastening device of the type for mooring boats to stationary objects such as a tree, limb, pier, root, dock, etc.

The difficulties inherent in mooring or making fast boats at random locations are well known. If a rope is used for securing a boat to an available stationary object, it usually is necessary to tie the rope tightly about the object. Not only does this require time and effort, but it is troublesome and difficult to release the boat rapidly when desiring to move to another location. Also, the loose end of the rope may become fouled in submerged brush and requires tedious effort to effect its release.

If, on the other hand, some type of known fastening device is used, thereby eliminating the necessity of actually tying fast to a stationary object, other problems arise. The gripping portion of most such devices is comprised solely of coacting metal arms having teeth, which are rigidly arranged and cannot be adapted to fit snugly about irregular surfaces. Thus, these fastening devices lack the advantageous feature of flexibility which is found in rope, wire, or cable when used for fastening.

It is also an undesirable feature of many such fastening devices that it is necessary to reach around or to overreach the stationary object with the hands or to use two hands in order to attach the fastening device. This often constitutes a safety hazard when the fastening operation is effected from a small boat.

The present invention is specially designed to possess the advantages inherent in using a rope for fastening, as well as the advantages inherent in using known metal fastening devices without being encumbered by the disadvantages existent in these two general types of fasteners as previously used.

Broadly, our invention resides in a pair of pivotally cooperating arms carrying piercing points at their termini, which points coact with a rope or cable so as to grip the object to which it is desired to fasten.

More specifically, the invention includes a pair of arms joined together at a point intermediate their length by a pivot pin. These arms are concave in cross-section throughout their length except for a small portion of each arm located intermediate the length of the arm. This portion is tubular in cross-section.

A double pronged point is mounted in each arm at its end most distally located with respect to the pivot point. The points are mounted so that the prongs are generally pointed toward each other. A pulley is mounted in each arm adjacent the points.

The end portions of the arms located most proximally to the pivot point are wing-shaped to facilitate their use as handles in the operation of the device.

A rope or other flexible member is passed along the concave of one arm, over the pulley in that arm, over the pulley in the second arm and back along the concave of the second arm. By this arrangement, the bight of the rope is made to pass directly beneath the points mounted in the ends of the arms.

The arms of the device are automatically maintained in their closed position by a weak spring located at the pivot point.

By pressing together the winged handle portions of the arms, the ends of the arms carrying the piercing points are pivoted to open position and the fastener can be pushed over an object to be grasped. A further pushing upon the fastener in the direction of the object forces the object further inward between the arms and downward upon the rope, forcing the latter to assume the shape of a catenary between the two pulleys. The pressure of the fingers upon the handles is then released allowing the piercing points to close upon the object under the action of the weak spring. When the rope is tensioned by drift of the boat away from the point of fastening, pressure is imparted through the catenary upon the grasped object to further impale it upon the piercing points.

It is an object of the described invention to provide a device which is inexpensive to manufacture and extremely efficient in operation, use and service.

A further object is to provide a fastening device in which a rope or cable does a major part of the actual gripping and by virtue of its intimate contact with the object grasped, allows the fastening device to fit snugly about objects of irregular shape.

Another object is to provide a device of this type which is maintained in closed position when tension upon the rope or cable is released or decreased, by the use of a spring loaded pivot mechanism which maintains the device fastened about a stationary object even when the boat or moving object is exerting no pull upon the rope or cable.

It is also an object of our invention to provide a device of the type mentioned which has the ability to withstand angular or canted pulls without releasing its grip.

Various other objects or advantages of our invention will be obvious from the following detailed description of a preferred form of mechanism embodying the invention taken with the accompanying drawings. In describing the invention in detail, reference will be had to the accompanying drawings wherein like characters denote like or corresponding parts throughout the several views, and in which:

Figure 1 is a view in side elevation partly cut away of the subject matter of the present invention;

Figure 2 is a view in cross section taken on line 2—2 of Figure 1;

Figure 3 is a view in section taken along line 3—3 of Figure 1;

Figure 4 is a view in section taken along line 4—4 of Figure 1; and

Figure 5 is a view in section taken along line 5—5 of Figure 1.

Referring to the drawings in detail, a pair of arms are indicated by numerals 1 and 2. The arms 1 and 2 are concave in cross section near their end portions (Figures 3 and 5). A small portion of each of the arms 1 and 2 intermediate their length is tubular in cross section as shown in Figure 4. Each arm 1 and 2 defines a pair of aligned holes, at a point intermediate the length of the arms. The arms 1 and 2 are located in such relation to each other that the holes of both arms are aligned in registry and a sleeve 12 is pressed into the holes. A pivot screw 8 passes through sleeve 12 and is secured in this position by a nut 13 and washers 11 (see Figure 2). Mounted circumferentially upon sleeve 12, is a spring 10 whose ends protrude a short distance along the length of the arms 1 and 2. A rivet 9 passes through each arm at a point adjacent the sleeve 12 and cooperates with an end of the spring 10.

A double pronged piercing point 3 is mounted in one end of each arm and is attached to the arm by rivets 14 or other means. The double pronged piercing points 3 are so mounted that their prongs define an acute angle with their respective arms and are maintained in opposed relation to each other.

A pulley 5 is mounted in each of the arms 1 and 2 in adjacent relation to the piercing points 3. Spacing sleeves 6 and rivets 7 are used to attach the pulleys 5 to the arms 1 and 2.

Each of the arms 1 and 2 has a winged-shaped end portion 16 located opposite the end of the arm carrying the piercing point 3.

The concave and tubular portions of arms 1 and 2 are so arranged as to form guideways for a rope 4 or other flexible member. The tubular portion is located intermediate the pivot point of the ends of the arms 1 and 2 carrying the piercing points 3. The rope 4 or other flexible member passes into the concave of one of the arms 1 or 2 at a point near the wing-shaped end portion 16, thence along the length of the arm, through the tubular section of the arm, over the pulley 5 mounted in the arm, over the second pulley 5 mounted in the second arm, thence through the tubular section of the second arm, and out of the concave of the second arm at a point adjacent the wing-shaped end portion 16 of the second arm.

In Figure 1, an object 15 is shown grasped by the fastening device.

The operation of the preferred embodiment of our invention illustrated by the accompanying drawings will now be described.

By pressing together with the thumb and fingers the lower or wing portions 16 of arms 1 and 2, the arms 1 and 2 are forced open at their ends which carry the piercing points 3 against the slight pressure of spring 10 which normally tends to maintain the arms in their closed position. When the arms are thus opened, the rope 4 will normally extend in approximately a straight line between pulleys 5 and directly adjacent to piercing points 3. The fastening device is then pushed over an object 15 to be grasped in such a way that the object 15 passes between the piercing points 3 and is forced against the rope 4. Upon further pushing of the fastening device the rope 4 yields to the pressure of the object 15 and tends to assume the shape of the object. As soon as the object is well within the arms 1 and 2 and past the piercing points 3 the pressure upon the wing portions 16 of arms 1 and 2 is released. Under the influence of spring 10, the ends of arms 1 and 2 bearing piercing points 3 close upon the object 15 and piercing points 3 bite into the object.

Tension is then exerted upon the protruding ends of rope 4 which causes the catenary of cord 4 to fit snugly about the object 15 and to force it to become more firmly impaled upon piercing points 3. A firm holding effect is thus created which becomes more effective with increase in tension exerted upon line 4.

If conditions occur which reduce or eliminate the tension exerted upon rope 4, such as a shift in water current under the boat etc., the fastening device maintains its grasp upon object 15 due to the closing force exerted by spring 10.

It will be seen that slight modifications in design of the piercing points will enable the device to be fastened around objects without any penetration of the piercing points 3 occurring. This would, of course, be desirable when mooring to a steel rod or bar such as might be encountered in the case of ladders on piers, cleats on docks or other boats, etc.

It is evident that various changes may be resorted to in the construction, form and arrangement of the several parts without departing from the spirit and scope of our invention and that it may be applied to a number of uses where a fastening function is to be effected. We therefore do not intend to be limited to the embodiment herein shown and described except as set forth in the following claims.

What is claimed is:

1. A fastening device comprising a pair of arms pivotally connected at a point intermediate their length, a piercing point mounted in one end of each of said arms, said piercing points being located in opposed relation to each other, pulleys mounted in said arms adjacent said piercing points, and a flexible member passing over said pulleys and between said arms in a line immediately adjacent said piercing points, said flexible member and said piercing points coacting in the operation of said device to grip an object between them.

2. A fastening device comprising a pair of arms connected pivotally at a point intermediate their length, said arms each defining a tubular portion intermediate their length, a piercing point mounted in one end of each of said arms, said piercing points being located in opposed relation, a pulley mounted in each of said arms adjacent said piercing point, and a flexible member passing over said pulleys, between said arms in a line immediately adjacent said piercing points through said tubular portion of said arms and along the length of said arms.

3. A fastening device comprising a pair of arms connected pivotally at a point intermediate their length, each of said arms defining a tubular portion intermediate their length, a spring coacting with said arms so as to urge said arms toward each other at their termini, a piercing point mounted in one end of each of said arms, said piercing points being located in opposed relation, a pulley mounted in each of said arms adjacent said piercing point, and a rope passing along a portion of the length of said arms, through said tubular portion of said arms, over said pulleys and between said arms so as to pass adjacent said piercing points.

4. A fastening device as claimed in claim 3 in which said arms have wing shaped end portions located in longitudinally opposed relation to the ends of said arms which bear said piercing points, said wing shaped end portions acting as handles in the operation of said fastening device.

5. A fastening device comprising a pair of arms connected pivotally at a point intermediate their length, said arms being concavely shaped near their end portions and tubularly shaped at a point intermediate their length, a spring coacting with said arms so as to urge said arms toward each other at their termini, a piercing point mounted in one end of each of said arms, said piercing points being located in opposed relation, wing shaped end portions of said arms located in longitudinally opposed relation to the ends of said arms which bear said piercing points, said wing shaped portions acting as handles in the operation of said fastening device, a pulley mounted in each of said arms adjacent said piercing points, and a rope threaded through the length of one of said arms, over the said pulley in said arm, over the second pulley mounted in the second said arm, and through the length of said second arm, said rope extending between said arms at a point adjacent said piercing points.

6. A fastening device comprising a pair of arms cooperating pivotally at a point intermediate their length and said arms being concavely shaped in cross-section near their end portions and tubularly shaped in cross-section at a point intermediate the pivot point of said arms and the end portions of said arms most distal from the pivot point, a spring coacting with said arms so as to urge said arms toward each other at their termini, a piercing point mounted in each of said arms at the ends of said arms located most distal from their pivot point, said piercing points being located in opposed relation, wing shaped end portions of said arms located in longitudinally opposed relation to the ends of said arms which bear said piercing points, said wing shaped portions acting as handles in the operation of said fastening device, a pulley mounted in each of said arms adjacent said piercing points, and a rope threaded through the length of one of said arms, over one of the said pulleys mounted in one of said arms, over the second said pulley mounted in the second said arm, and through the length of said second arm, said rope extending between said arms at a point adjacent said piercing points.

7. A fastening device comprising a pair of arms being concavely shaped in cross-section near their end portions and tubularly shaped at a point intermediate their length, each of said arms defining a pair of aligned holes at a point intermediate the length of said arms, said holes in each arm being aligned in registry with said holes in the other said arm, a sleeve passing through the said holes in said arms, a screw passing through said sleeve and pivotally securing said arms to each other, a spring circumferentially mounted on said sleeve, rivets mounted in said arms and bearing against the ends of said spring so that said spring is maintained under tension and urges said arms toward each other at their termini lying most distal from their pivot point, piercing points mounted in opposed relation in said arms at said distal termini, pulleys mounted in said arms adjacent said piercing points, wing shaped end-portions of said arms located adjacent the proximal termini of said arms, said wing shaped end-portions acting as handles in the operation of said fastening device, and a rope threaded through the length of one of said arms, over the said pulley in said arm, over the second said pulley mounted in the second said arm, and through the length of said second arm, said rope extending between said arms at a point adjacent said piercing points.

8. A fastening device comprising a pair of arms pivotally connected at a point intermediate their length, a pair of engaging elements each projecting from the ends of said arms toward each other, guide means mounted in each said arm adjacent said engaging element, and a flexible member passing over said guide means in slidable relation thereto and passing between said arms in a line immediately adjacent said engaging elements, said flexible member and said engaging elements coacting in the operation of said device to grip an object between them.

9. A fastening device comprising a pair of arms pivotally connected at a point intermediate their length, a pair of engaging elements each projecting from the ends of said arms toward each other, guide means mounted in each said arm adjacent said engaging elements, and a flexible member extending across the free space between the ends of said arms which carry said engaging elements and passing over said guide means in slidable relation thereto.

10. A fastening device comprising a pair of arms pivotally connected at a point intermediate their length, a pair of engaging elements each projecting from the ends of said arms toward each other, guide means mounted in each said arm adjacent said engaging elements, and a flexible member extending across the free space between the ends of said arms which carry said engaging elements and passing over said guide means in slidable relation thereto, said arms and said flexible member defining a triangular space with the vertices of said triangle located at the pivot point and the guide means of said fastening device.

References Cited in the file of this patent
UNITED STATES PATENTS

| | | |
|---|---|---|
| 913,540 | Myers | Feb. 23, 1909 |
| 1,731,970 | Carlson | Oct. 15, 1929 |